(12) United States Patent
Matsuoka (10) Patent No.: US 11,790,185 B2
(45) Date of Patent: Oct. 17, 2023

(54) CREATED TEXT EVALUATION DEVICE (71) Applicant: NTT DOCOMO, INC., Chiyoda-ku (JP)

(72) Inventor: Hosei Matsuoka, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 434 days.

(21) Appl. No.: 17/043,433

(22) PCT Filed: Mar. 28, 2019

(86) PCT No.: PCT/JP2019/013792
§ 371 (c)(1),
(2) Date: Sep. 29, 2020

(87) PCT Pub. No.: WO2019/225154
PCT Pub. Date: Nov. 28, 2019

(65) Prior Publication Data
US 2021/0019478 A1 Jan. 21, 2021

(30) Foreign Application Priority Data
May 23, 2018 (JP) .................................. 2018-098812

(51) Int. Cl.
*G06F 40/51* (2020.01)
*G06F 40/263* (2020.01)
*G06N 3/049* (2023.01)

(52) U.S. Cl.
CPC ............ *G06F 40/51* (2020.01); *G06F 40/263* (2020.01); *G06N 3/049* (2013.01)

(58) Field of Classification Search
CPC ....... G06F 40/51; G06F 40/263; G06N 3/049; G06N 3/044; G06N 3/045; G06N 3/08
(Continued)

(56) References Cited

U.S. PATENT DOCUMENTS 8,386,234 B2 * 2/2013 Uchimoto ............... G06F 40/47
704/7

FOREIGN PATENT DOCUMENTS

JP 2018-5218 A 1/2018
WO WO-2006134759 A1 * 12/2006 ............. G06F 17/27

OTHER PUBLICATIONS

International Preliminary Report on Patentability dated Dec. 3, 2020 in PCT/JP2019/013792 (submitting English translation only), 6 pages.
(Continued)

*Primary Examiner* — Thierry L Pham
(74) *Attorney, Agent, or Firm* — Oblon, McClelland, Maier & Neustadt, L.L.P.

(57) ABSTRACT

A created sentence evaluating device 1 using a neural network unit 10 of an encoder/decoder model in which an encoder unit 100 inputs a sentence in a first language, and a decoder unit 101 sequentially outputs word candidates for a sentence in a second language corresponding to the sentence in the first language and likelihood of the word candidates includes: an encoder input unit 13 configured to input a created sentence created in the second language to the encoder unit 100 sequentially for each word; and an evaluation unit 17 configured to evaluate words of the created sentence on the basis of word candidates in the second language and the likelihood of the word candidates output by the decoder unit 101 on the basis of an input from the encoder input unit 13.

9 Claims, 5 Drawing Sheets (58) Field of Classification Search
USPC .......................................................... 704/2
See application file for complete search history.

(56) References Cited

OTHER PUBLICATIONS

International Search Report dated Jul. 2, 2019 in PCT/JP2019/013792 filed on Mar. 28, 2019, 1 page.

* cited by examiner

CREATED TEXT EVALUATION DEVICE

TECHNICAL FIELD

It relates to a created sentence evaluating device that evaluates a sentence created by a user translating a sentence in a first language into a second language.

BACKGROUND ART

Conventionally, neural machine translation that is machine translation using a neural network of an encoder/decoder model composed of an encoder and a decoder is known. In a neural network of the encoder/decoder model, an encoder inputs a sentence in a first language (for example, Japanese), and a decoder outputs a sentence in a second language (for example, English) corresponding to the sentence in the first language as a result of translation.

For example, in the following Patent Literature 1, an automatic interpreting device including an encoder and a decoder configured in a neural network is disclosed.

CITATION LIST

Patent Literature

[Patent Literature 1] Japanese Unexamined Patent Publication No. 2018-5218

SUMMARY OF INVENTION

Technical Problem

The automatic interpreting device described above outputs a sentence "How do I get to Gangnam?" in a second language as a result of translation for a sentence "江南駅までどのよ うに行きますか?" in a first language that is input by a user. However, the automatic interpreting device described above, for example, cannot evaluate the appropriateness of translation and the like for a sentence in the second language that has been created by a user translating a sentence in the first language.

In view of problems relating thereto, an object is to provide a created sentence evaluating device capable of evaluating a created sentence created in a predetermined language.

Solution to Problem

In order to solve the problems described above, a created sentence evaluating device according to one aspect of the present invention is a created sentence evaluating device using a recurrent neural network of an encoder/decoder model in which an encoder inputs a sentence in a first language, and a decoder sequentially outputs word candidates for a sentence in a second language corresponding to the sentence in the first language and likelihood of the word candidates including a decoder input unit configured to sequentially input respective words of a created sentence created in the second language to the decoder; and an evaluation unit configured to evaluate the words of the created sentence on the basis of the word candidates in the second language and the likelihood of the word candidates output by the decoder on the basis of an input from the decoder input unit, and performs outputting based on a result of the evaluation.

According to such a created sentence evaluating device, words included in a created sentence created in the second language can be evaluated. In other words, a created sentence created in a predetermined language can be evaluated.

Advantageous Effects of Invention

A created sentence created in a predetermined language can be evaluated.

DESCRIPTION OF EMBODIMENTS

Hereinafter, a created sentence evaluating device according to an embodiment will be described in detail with reference to the drawings. In addition, in description of the drawings, the same reference sign will be assigned to the same elements, and duplicate description thereof will be omitted. Furthermore, an embodiment in the following description is a specific example of the present invention, and the present invention is not limited to such an embodiment unless otherwise stated.

Figure 1:
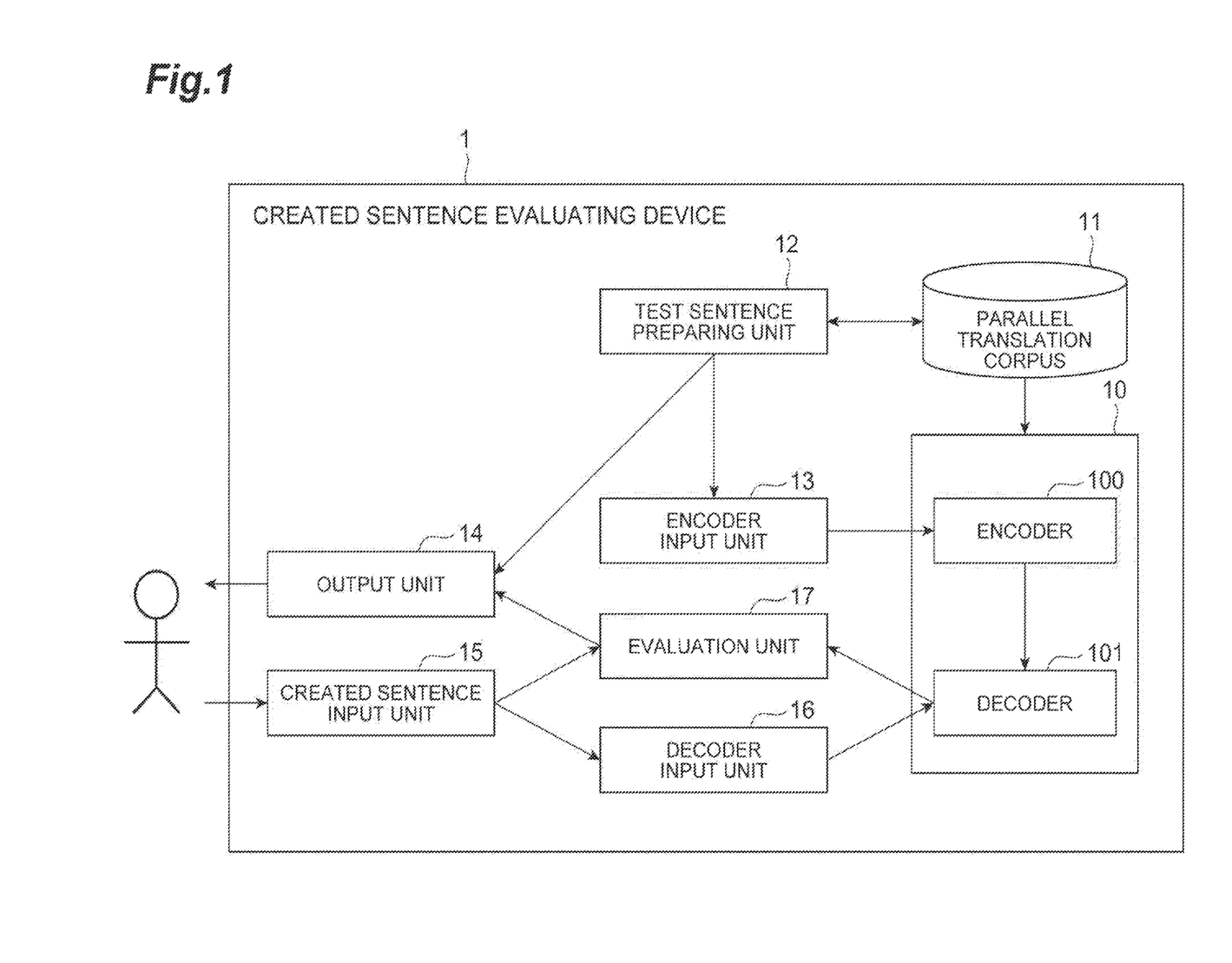
FIG. 1 is a functional block diagram of a created sentence evaluating device according to an embodiment of the present invention.

FIG. 1 is a functional block diagram of a created sentence evaluating device 1. As illustrated in FIG. 1, the created sentence evaluating device 1 is configured to include a neural network unit 10, a parallel translation corpus storing unit 11, a test sentence preparing unit 12, an encoder input unit 13, an output unit 14, a created sentence input unit 15, a decoder input unit 16, and an evaluation unit 17. In addition, the neural network unit 10 is configured to include an encoder unit 100 and a decoder unit 101.

The created sentence evaluating device 1 evaluates a created sentence that is created by translating a sentence in a first language into a second language. The first language, for example, may be Japanese but may be any other language. The second language is a language different from the first language and, for example, may be English but may be any other language. The first language and the second language may be dialects of different regions (for example, a standard language of Japan and a Kansai dialect). A language is not limited to a natural language and may be an artificial language, a formal language (a computer programming language), or the like. Although a created sentence is intended to be created by a person such as a user of the created sentence evaluating device 1 or the like, it may be a sentence created by an object other than a person. An evaluation represents determination of an appropriateness (good or poor or a suitableness) or the like of a translation of a created sentence.

Hereinafter, each functional block of the created sentence evaluating device 1 illustrated in FIG. 1 will be described.

The neural network unit 10 is a recurrent neural network (RNN) of the encoder/decoder model (other names: an encoder-decoder translation model and a sequence-to-sequence model) composed of the encoder unit 100 and the decoder unit 101. For example, the neural network unit 10 may be a recurrent neural network called a long short term memory (LSTM). The neural network unit 10 performs a neural machine translation. In addition, the neural network unit 10 may be disposed inside another device that can access/be accessed by the created sentence evaluating device 1 through a network instead of inside the created sentence evaluating device 1.

The encoder unit 100 receives a sentence in the first language as an input and outputs a vector of an intermediate layer (hidden layer). More specifically, the encoder unit 100 divides the sentence of the first language into words through morphological analysis or the like, converts word IDs corresponding to the words into word vectors (vectors of an input layer), then sequentially receives the word vectors as inputs (in order of the first word to the last word of the sentence), and sequentially outputs the vectors of the intermediate layer based on input details acquired by that time (calculates a neural network). At a time point at which "<EOS>" representing an end of the sentence is input, the encoder unit 100 outputs (delivers) the vectors of the intermediate layer based on the input details acquired by that time from the encoder unit 100 to the decoder unit 101. The encoder unit 100 can be conceptually regarded to perform a semantic analysis of the sentence in the first language and extract a semantic representation.

The decoder unit 101 receives vectors of the intermediate layer output from the encoder unit 100 as inputs, sequentially calculates vectors of the output layer on the basis of the vectors of the intermediate layer or on the basis of the vectors of the intermediate layer and words in the second language input to the decoder unit 101, and outputs the calculated vectors of the output layer. The vectors of the output layer are information representing a list of word candidates in the second language and likelihood of the word candidates. As one example of the list, there is "(word candidate "I" and likelihood "0.7" thereof, word candidate "We" and likelihood "0.2" thereof, word candidate "You" and likelihood "0.1" thereof)" or the like. The other functions of the decoder unit 101 will be described later.

As described above, the created sentence evaluating device 1 uses the neural network unit 10 in which the encoder unit 100 inputs a sentence in the first language, and the decoder unit 101 sequentially outputs word candidates for a sentence in the second language corresponding to the sentence in the first language and likelihood of the words candidates.

Hereinafter, a process of a decoder when a neural machine translation is performed in a recurrent neural network of a general encoder/decoder model (hereinafter, referred to as a "general decoder") will be described. First, when a vector of an intermediate layer output from an encoder is input, the general decoder outputs a vector of an output layer corresponding to the first word of a sentence in the second language to be finally output on the basis of the input vector of the intermediate layer. Thereafter, the general decoder repeats a process of extracting a word of which likelihood is the maximum among word candidates represented by a vector of an output layer of the N-th word (here, N is an integer that is equal to or larger than "1"), inputting the extracted word to its own decoder (the general decoder), and outputting the vector of the output layer of the (N+1)-th word on the basis of the input word and a vector of the intermediate layer used when the vector of the output layer of the N-th word is output up to the last word of the sentence in the second language. Conceptually, the general decoder can be regarded to generate a sentence (in the second language different from the first language) from a semantic representation extracted by the encoder.

The parallel translation corpus storing unit 11 stores a parallel translation corpus of the first language and the second language. The parallel translation corpus is a corpus (a database of sentences), in which a sentence and a sentence of different languages are arranged in the form of a parallel translation, built for being used as learning data of a machine translation. The neural network unit 10 performs learning on the basis of the parallel translation corpus stored by the parallel translation corpus storing unit 11. Learning may be performed on the basis of an instruction from a manager of the created sentence evaluating device 1 or may be performed regularly (for example, once in one week).

The test sentence preparing unit 12 prepares a test sentence, which is a sentence in the first language, presented to a user as a test sentence. More specifically, the test sentence preparing unit 12 extracts a sentence in the first language included in the parallel translation corpus stored by the parallel translation corpus storing unit 11. A sentence in the first language to be extracted may be random or in a predetermined order. The test sentence preparing unit 12 may acquire a test sentence not from the parallel translation corpus stored by the parallel translation corpus storing unit 11 but from another means, another device, or the like. The test sentence preparing unit 12 outputs the prepared test sentence to the encoder input unit 13 and the output unit 14.

The encoder input unit 13 inputs the test sentence output from the test sentence preparing unit 12 to the encoder unit 100.

The output unit 14 outputs the test sentence output from the test sentence preparing unit 12. More specifically, the output unit 14 displays the test sentence to a user through an output device 1006 (for example, a screen) to be described later. The other functions of the output unit 14 will be described later.

The created sentence input unit 15 inputs a created sentence created in the second language. More specifically, after a test sentence is displayed to a user by the output unit 14, the created sentence input unit 15 inputs a created sentence created by the user translating the displayed test sentence into the second language through an input device 1005 (for example, a keyboard) to be described later. In other words, the created sentence is a sentence created by a user translating a sentence written in the first language input to the encoder unit 100 into the second language. In this embodiment, although it is assumed that a created sentence is created by a user, the created sentence may be created by a person other than the user or a device. The created sentence input unit 15 outputs the created sentence to the decoder input unit 16 and the evaluation unit 17.

The decoder input unit 16 sequentially inputs the created sentence to the decoder unit 101 for each word. More specifically, the decoder input unit 16 divides the created sentence output from the created sentence input unit 15 into words through a morphological analysis or the like, converts a word ID corresponding to each of the words into a word vector (a vector of the input layer), and then inputs the word vectors to the decoder unit 101 sequentially (in order of the first word to the last word of the created sentence).

Here, the decoder input unit 16 sequentially inputs words of the created sentence described above to the decoder unit 101 with being replaced with word candidates that are sequentially output by the decoder unit 101. In other words, although a general decoder sets a word (a word candidate having a maximum likelihood) output from the general decoder as a next input of the general decoder, the decoder unit 101 of the created sentence evaluating device 1 sets the word of the created sentence as an input of the decoder unit 101.

A process of the decoder unit 101 based on an input of the decoder input unit 16 will be described more specifically. First, when a vector of the intermediate layer output from the encoder unit 100 is input, the decoder unit 101 outputs a vector of the output layer corresponding to the first word of the sentence written in the second language that is finally output based on the input vector of the intermediate layer. Thereafter, the decoder unit 101 repeats a process of receiving an M-th word (here, M is an integer that is equal to or larger than "1") of the created sentence input by the decoder input unit 16 in the decoder unit 101 as an input and outputting a vector of an output layer corresponding to an (M+1)-th word of the created sentence on the basis of the input word and the vector of the intermediate layer used when the output of the vector of the previous output layer is performed up to the last word of the created sentence.

In addition, when the encoder input unit 13 inputs a test sentence to the encoder unit 100, the encoder unit 100 performs calculation and outputs a vector of an intermediate layer to the decoder unit 101, and the decoder unit 101 outputs a vector of an output layer corresponding to the first word of the sentence written in the second language that is finally output on the basis of the input vector of the intermediate layer. However, a subsequent process is deferred until there are sequential inputs of words of a created sentence from the decoder input unit 16.

The evaluation unit 17 evaluates (scores) a word of a created sentence on the basis of a word candidate in the second language and likelihood of the word candidate output by the decoder on the basis of an input from the decoder input unit 16, and outputs a result of the evaluation to the output unit 14. The evaluation unit 17 may evaluate a word next after the input word that is a word of the created sentence input by the decoder input unit 16 in the created sentence on the basis of a word candidate in the second language and likelihood of the word candidate output by the decoder for the input word.

More specifically, first, the evaluation unit 17 acquires a word candidate in the second language and likelihood of the word candidate output by the decoder unit 101 for an M-th (here, M is an integer that is equal to or larger than "1") word (input word) of a created sentence input by the decoder input unit 16. Next, the evaluation unit 17 acquires an (M+1)-th word that is a word next after the M-th word in the created sentence output from the created sentence input unit 15. Next, the evaluation unit 17 acquires likelihood associated with the same word candidate as the (M+1)-th word among word candidates and likelihood of the word candidates that have been acquired as likelihood of the (M+1)-th word. Next, the evaluation unit 17 acquires a maximum likelihood (likelihood of the most appropriate word candidate as a translation) among the word candidates and the likelihood of the word candidates that have been acquired. Next, the evaluation unit 17 calculates a value acquired by dividing the acquired likelihood of the (M+1)-th word by the acquired maximum likelihood (likelihood ratio) as an evaluation value of the (M+1)-th word of the created sentence. Next, the evaluation unit 17 outputs the calculated evaluation value to the output unit 14. In addition, the calculation of an evaluation value is not limited to the division described above and, for example, may be any calculation based on a comparison between the likelihood of the (M+1)-th word and the maximum likelihood (or likelihood acquired in accordance with a predetermined criterion among word candidates and likelihood of the word candidates that have been acquired) or may be any other calculation based on likelihood.

The evaluation unit 17 may calculate an evaluation value of the (entire) created sentence based on an evaluation value of each word of a created sentence and output the calculated evaluation value to the output unit 14. For example, the evaluation unit 17 may calculate an average evaluation value acquired by averaging evaluation values of words of a created sentence as an evaluation value of the created sentence.

The evaluation unit 17 may output some or all of the word candidates and likelihood of the word candidates that have been acquired to the output unit 14. For example, the evaluation unit 17 may output word candidates of which likelihood are higher than a predetermined criterion among word candidates and likelihood of the word candidates that have been acquired or a word candidate of which likelihood is a maximum to the output unit 14.

The output unit 14 performs outputting on the basis of an evaluation result output from the evaluation unit 17. The output unit 14 may display evaluation values (scores) of words of a created sentence output from the evaluation unit 17 (for each word). The output unit 14 may display an evaluation value (total score) of an (entire) created sentence output from the evaluation unit 17. The output unit 14 may display words of the created sentence based on evaluation values of the words output from the evaluation unit 17. For example, the output unit 14 may display a word with a color, a size, and the like of the word changed for each word of which an evaluation value is smaller than a predetermined criterion. The output unit 14 may display a word candidate of which likelihood, which is output from the evaluation unit 17 as a different candidate (an optimal word for each word) for a word of a created sentence, is higher than a predetermined criterion or a word candidate of which likelihood is a maximum. The output unit 14 may display words by combining one or more of the display methods described above. For example, the output unit 14 may also display a word candidate of which likelihood is a maximum together as a different candidate for a word of which an evaluation value is smaller than a predetermined criterion. The output unit 14 may acquire and display a model answer for a test sentence by referring to a parallel translation corpus stored by the parallel translation corpus storing unit 11. In addition, the output unit 14 is assumed to appropriately acquire various kinds of information required for output from other functional blocks. Furthermore, some of functions of the output unit 14 may be built into the evaluation unit 17. In other words, the evaluation unit 17 may directly output an evaluation result together with performing an evaluation.

Figure 2:
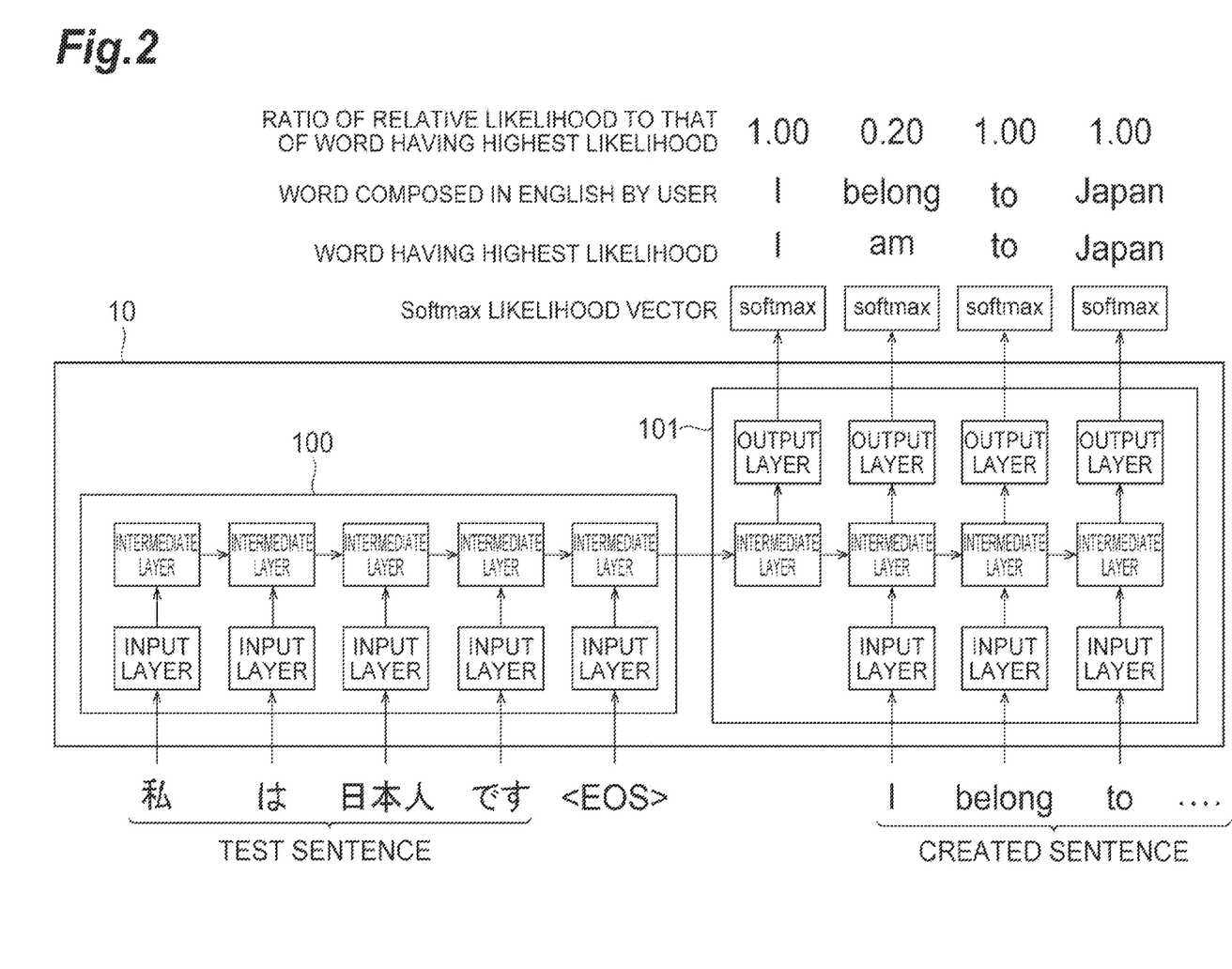
FIG. 2 is a diagram illustrating examples of a machine translation and an evaluation.

FIG. 2 is a diagram illustrating an example of a machine translation and an evaluation in the created sentence evaluating device 1. In the example illustrated in FIG. 2, an example of scoring (evaluating) in a case in which a test sentence "私は日本人です" is presented to a user, and the user creates a created sentence "I belong to Japan" is illustrated. In addition, a model answer for the test sentence "私は日本人です" is "I am Japanese." First, when the test sentence "私は日本人です" is divided into words, "私," "は," "日本人," and "です" are acquired. These words are sequentially input to the encoder unit 100. After the word "です ," a symbol "<EOS>" representing an end of the sentence is input. When the symbol "<EOS>" is input, the neural network unit 10 starts to output word candidates and likelihood of the word candidates from the decoder unit 101 (likelihood in an output layer is calculated using a Softmax function or the like). A word candidate that is output first is "I" of which likelihood is the highest. Since a first word of the created sentence created by the user is "I" as well, the score is set to "1.00" (division using the same likelihood) due to the same likelihood.

Next, the word "I" created by the user is input as an input of the decoder unit 101 (the created sentence created by the user is assumed to be sequentially input to the decoder unit 101 for each word). Then, as an output of the decoder unit 101, "am" has a highest likelihood, and the likelihood is "0.75." However, a word created by the user is "belong," and the likelihood of this word is "0.15." Accordingly, "0.20" acquired by dividing the likelihood of "belong" by the likelihood of "am" is a score (evaluation value) of "belong." Next, as an input of the decoder unit 101, not "am" but "belong" is input. Then, an output of the decoder unit 101, "to" having a highest likelihood is output. A word created by the user is "to" as well, and accordingly, the score is "1.0." In this way, scores are sequentially calculated for the words.

Figure 3:
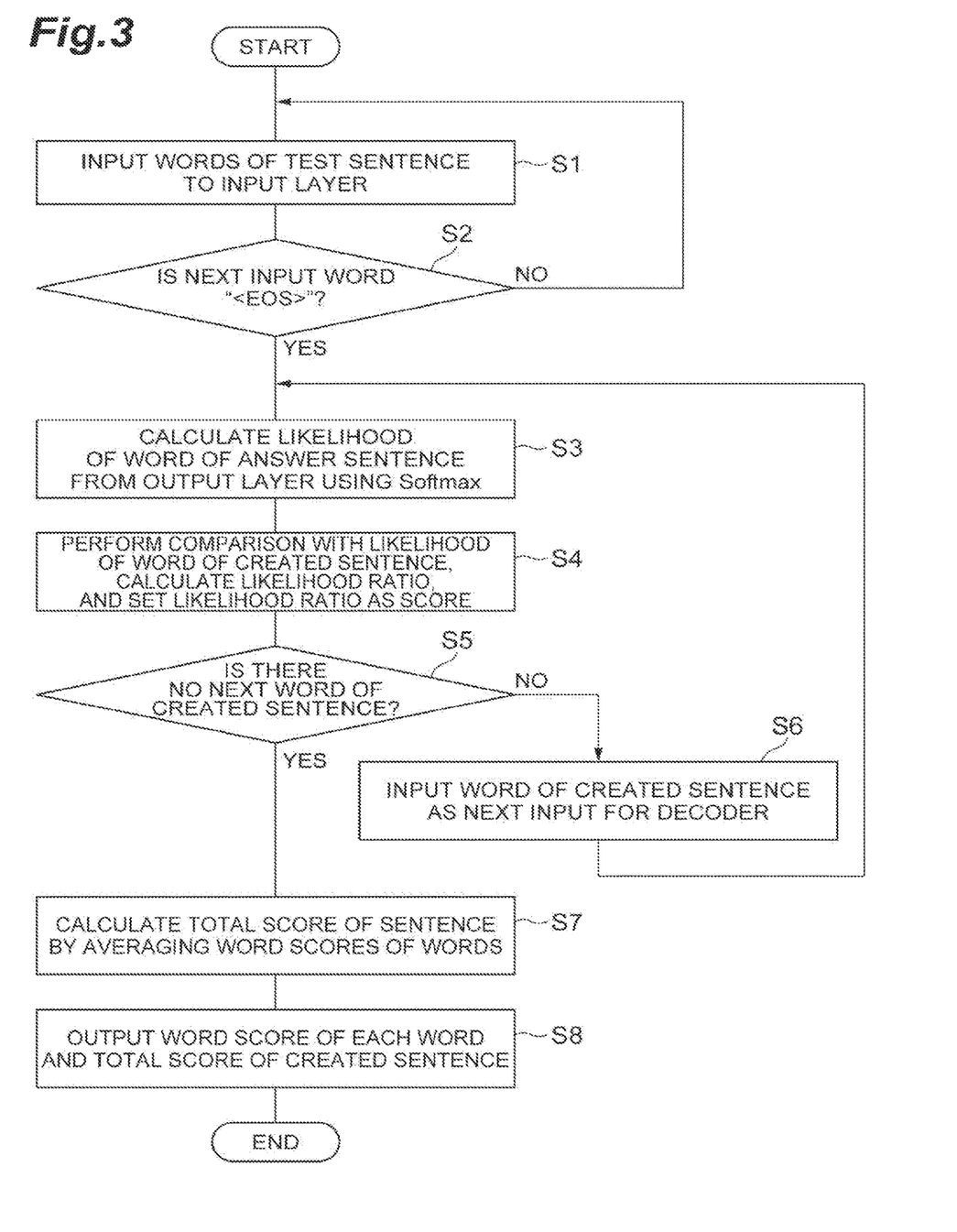
FIG. 3 is a flowchart illustrating a process executed by a created sentence evaluating device according to an embodiment of the present invention.

FIG. 3 is a flowchart illustrating a part of a process (a created sentence evaluating method) executed by the created sentence evaluating device 1. First, (words of) a test sentence is input to input layers of the encoder unit 100 by the encoder input unit 13 (Step S1). Next, it is determined by the encoder unit 100 whether or not a next input word is "<EOS>" (Step S2). In a case in which it is determined that the next input word is not "<EOS>" (S2: No), the process is returned to the process of S1 for the next input word. On the other hand, in a case in which it is determined that the next input word is "<EOS>" (S2: Yes), subsequently, likelihood of a word (candidate word) of an answer sentence (a sentence ill the second language that is finally output) is calculated from an output layer using Softmax by the decoder unit 101 (Step S3). Next, likelihood ratio is calculated as a word score by the evaluation unit 17 by comparing the likelihood with the word of the created sentence (Step S4). Next, it is determined by the decoder unit 101 whether or not there is a next word of the created sentence (Step S5). In a case in which it is determined that there is a next word (S5: No), the word of the created sentence is input as a next input of the decoder unit 101 by the decoder input unit 16 (Step S6), and the process is returned to the process of S3. On the other hand, in a case in which it is determined that there is no next word (S5: Yes), a total score is calculated as a sentence (created sentence) by the evaluation unit 17 by averaging word scores of the words (Step S7). Next, the word score of each of the words and a total score of the created sentence are output by the output unit 14 (Step S8).

Figure 4:
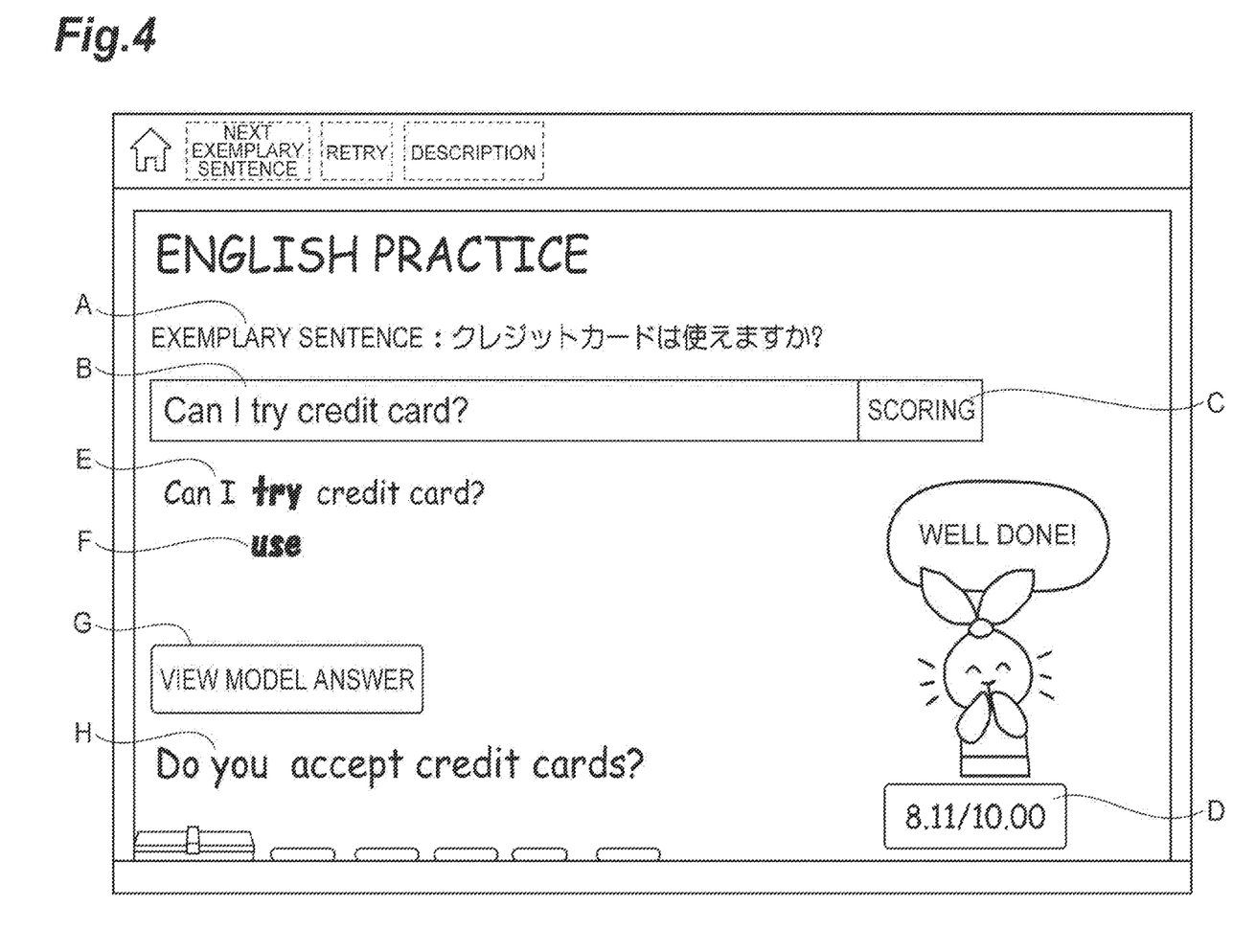
FIG. 4 is a diagram illustrating one example of an interface.

FIG. 4 is a diagram illustrating one example (an example of a screen) of an interface of the created sentence evaluating device 1. In the interface illustrated in FIG. 4, a test sentence written in Japanese (a first language) is presented to a user, the user inputs a created sentence in English (a second language) composed by the user for the test sentence, and the created sentence is scored. A reference sign A represents a test sentence "クレジットカー ドは使えますか ?." A reference sign B represents a created sentence "Can I try credit card?" that is input to a text box by a user. When a user presses a "score" button represented by a reference sign C, scoring is executed. In addition, information represented by reference signs D, E, and F to be described below is displayed after the execution of scoring.

The reference sign D represents "8.11" points out of "10.00" points that are a total score of the created sentence as a result of the scoring. In addition, a character image corresponding to the total score may be displayed in the vicinity of the reference sign D. The reference sign E is a created sentence and represents a created sentence in which a word (a word "try" in FIG. 4), of which an evaluation value is lower than a predetermined criterion as a result of scoring, is displayed with the color changed. The reference sign F illustrates a word candidate (a word "use" in FIG. 4) of which likelihood is a maximum as a different candidate for a word of which the evaluation value described above is lower than a predetermined criterion. When the user presses a "view a model answer" button represented by the reference sign G, the model answer for the test sentence is displayed. A reference sign H represents the displayed model answer "Do you accept credit cards?."

Next, operations and effects of the created sentence evaluating device 1 configured as in this embodiment will be described.

According to the created sentence evaluating device 1 of this embodiment, the decoder input unit 16 inputs a created sentence created in the second language to the decoder unit 101 sequentially for each word, and the evaluation unit 17 and the output unit 14 evaluate the word of the created sentence on the basis of a word candidate in the second language and likelihood of the word candidate that are output by the decoder unit 101 on the basis of an input from the decoder input unit 16, and performs outputting based on a result of the evaluation. More specifically, the evaluation unit 17 evaluates a word next after an input word that is a word of the created sentence input by the decoder input unit 16 on the basis of a word candidate in the second language and likelihood of the word candidate that are output by the decoder unit 101 for the input word. In this way, words of the created sentence created in the second language can be evaluated. In other words, a created sentence created in a predetermined language can be evaluated. In addition, a created sentence composed by a user can be evaluated for each word.

In addition, according to the created sentence evaluating device 1 of this embodiment, the decoder input unit 16 sequentially inputs words of a created sentence to the decoder unit 101 replacing word candidates sequentially output by the decoder unit 101. In this way, when the meaning of a test sentence able to be perceived by the encoder unit 100, a most suitable word that follows next for a word string of a created sentence created by a user can be determined. In addition, when the meaning of a test sentence is perceived, a next word is determined on the basis of a word of an expression selected by a user, and accordingly, an evaluation having a high degree of freedom of expression can be performed.

In addition, according to the created sentence evaluating device 1 of this embodiment, a created sentence is a sentence created by a user translating a sentence written in the first language input to the encoder unit 100 into the second language. In this way, the translation of the sentence written in the second language acquired by a user translating a sentence written in the first language can be evaluated.

In addition, according to the created sentence evaluating device 1 of this embodiment, the evaluation unit 17 and the output unit 14 display evaluation values of words of a created sentence, display the words of the created sentence on the basis of the evaluation values of the words, display a word candidate of which likelihood is higher than a predetermined criterion or a word candidate of which likelihood is a maximum as a different candidate for each of the words of the created sentence, and display an evaluation value of the created sentence based on the evaluation values of the words of the created sentence. In this way, not only an evaluation but also advice for a user for performing better translation and the like can be performed, whereby feedback learning for a user can be performed.

In addition, in the created sentence evaluating device 1 of this embodiment, the created sentence input unit 15 may output each of the words of the created sentence to the decoder input unit 16 and the evaluation unit 17 in real time without waiting for the end of user's input of all the words of the created sentence. Then, outputting performed by the output unit 14 may be performed in real time every time when an evaluation result is output from the evaluation unit 17. In this way, during a user's input of a created sentence, an evaluation at that time point and an optimal word are displayed, and accordingly, compared to a case in which an evaluation and an optimal word are displayed after the entire created sentence is input, and a certain time elapses, a role as a learning tool having an excellent learning effect for a user can be achieved.

Here, a background technology will be described. In recent years, automatic scoring for an English composition performed in an English test or the like has attracted attention. Up to now, although scoring has been manually performed for English compositions, this is an operation taking a long time and much effort when manually scoring a large number of compositions, and there is also a problem that it may be difficult to perform fair scoring due to different scoring criteria according to a scoring person. Thus, the need for an automatic scoring system for English compositions has increased. However, there are various scoring criteria for scoring English compositions, and, particularly in scoring putting emphasis on meanings, there are various methods of expressions, and it is difficult to compare an English composition with a model answer. Depending on a test sentence, several kinds of expressions may be considered, and it is difficult to prepare a model answer for each thereof.

In the created sentence evaluating device 1 of this embodiment, a word string of a sentence composed by a user is input to the decoder unit 101 using the neural network unit 10 that has learned through a neural machine translation, and it is calculated whether or not a next word is suitable on the basis of likelihood of the output of the decoder unit 101. Since the meaning of the test sentence is perceived by the encoder unit 100, each word can be evaluated (scored) while the freedom of expression of an English composition (a created sentence) is allowed with emphasis put on the meaning. In this way, scoring of an English composition, indicating of a word that is not quite suitable, presenting of an optimal word, and the like can be performed, and scoring and feedback of an English composition can be automated.

According to the created sentence evaluating device 1 of this embodiment, a free expression of a sentence (created sentence) composed in English by a user can be allowed while putting emphasis on the meaning of the test sentence, and each word of a word string of the sentence can be scored. Since the score of each word is calculated using whether or not it is suitable as a word following next as a criterion on the basis of a word string input by the user until that time, an expression desired to be used by the user can be scored regardless of the expression of a model answer. By averaging all the scores of the words, a total score of the entire sentence can be calculated. In addition, by indicating a word of which a score is low and presenting a suitable word to replace the word, this leads to user learning.

The following English composition scoring system is shown as a modified example of the created sentence evaluating device 1.

An English composition scoring system, which includes a neural network that has performed learning for machine translation, includes: a means that divides a test sentence into words and sequentially inputs the words to an encoder of the neural network; a means that divides a composed sentence into words and sequentially inputs the words to a decoder of the neural network; and a means that calculates scores of the words of a composed sentence by comparing likelihood of a word output from the decoder of the neural network with likelihood of a word of the composed sentence.

In the English composition scoring system described above, the means that calculates scores of the words calculates a score on the basis of likelihood of the word output using a Softmax function by the decoder of the neural network.

In the English composition scoring system described above, scores of the words of the composed sentence and a word of which likelihood is the highest at a position of each of the words are output.

Using the English composition scoring display system described above, an English composition scoring display screen displays a sentence composed for a test sentence on the basis of scores of words such that a superiority or inferiority thereof can be understood in units of words.

Each block diagram used for description of the embodiment described above illustrates blocks in units of functions. Such functional blocks (component units) are realized by an arbitrary combination of hardware and/or software. In addition, a means for realizing each functional block is not particularly limited. In other words, each functional block may be realized by one device that is combined physically and/or logically or a plurality of devices by directly and/or indirectly (for example, using a wire and/or wirelessly) connecting two or more devices separate physically and/or logically.

Figure 5:
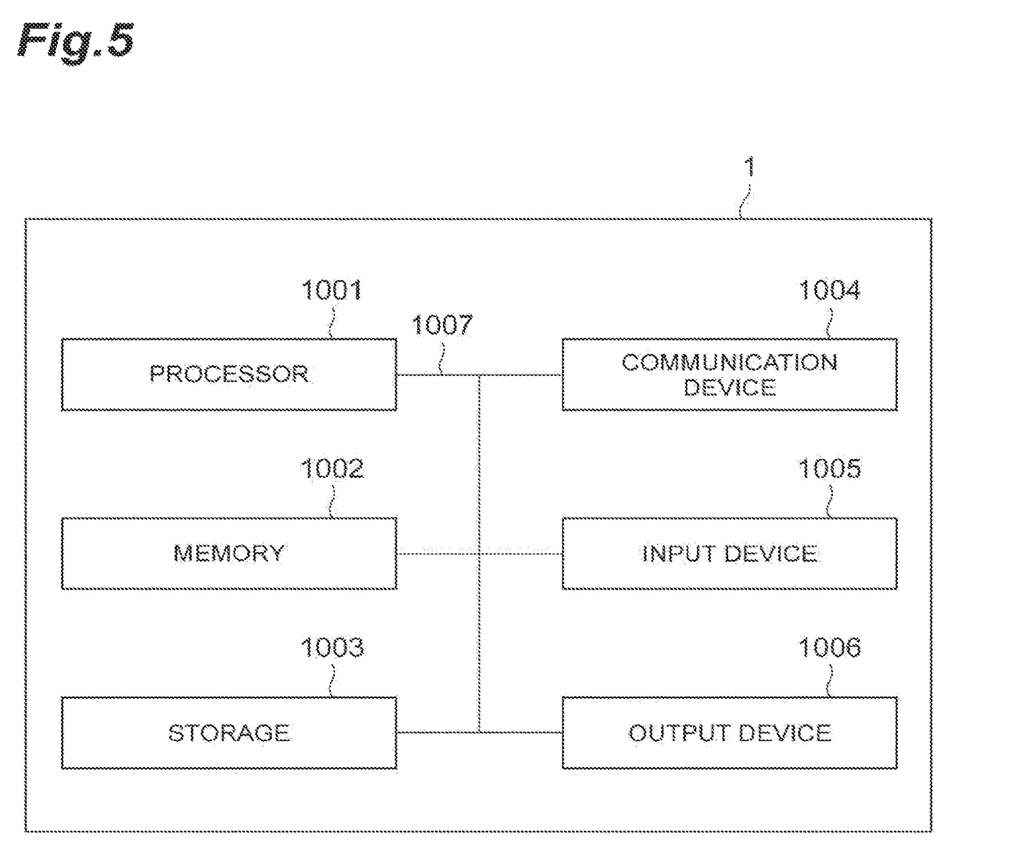
FIG. 5 is a hardware configuration diagram of a created sentence evaluating device according to an embodiment of the present invention.

For example, the created sentence evaluating device and the like according to one embodiment of the present invention may function as a computer that performs the process of a created sentence evaluating method according to one embodiment of the present invention. FIG. 5 is a diagram illustrating one example of the hardware configuration of the created sentence evaluating device 1 according to one embodiment of the present invention. The created sentence evaluating device 1 described above, physically, may be configured as a computer device including a processor 1001, a memory 1002, a storage 1003, a communication device 1004, an input device 1005, an output device 1006, a bus 1007, and the like.

In addition, in the following description, a term "device" may be rephrased with a circuit, a device, a unit, or the like. The hardware configuration of the created sentence evaluating device 1 may be configured to include one or a plurality of devices illustrated in the drawing and may be configured without including some of these devices.

Each function of the created sentence evaluating device 1 is realized when the processor 1001 performs an arithmetic operation by causing predetermined software (a program) to be read onto hardware such as the processor 1001, the memory 1002, and the like and controls communication using the communication device 1004 and data reading and/or data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, the test sentence preparing unit 12, the encoder input unit 13, the output unit 14, the created sentence input unit 15, the decoder input unit 16, the evaluation unit 17, and the like described above may be realized by the processor 1001.

In addition, the processor 1001 reads a program (a program code), a software module, and data from the storage 1003 and/or the communication device 1004 into the memory 1002 and executes various processes in accordance with these. As the program, a program causing a computer to execute at least some of the operations described in the embodiment described above is used. For example, the neural network unit 10 and the parallel translation corpus storing unit 11 may be realized by a control program that is stored in the memory 1002 and operated by the processor 1001, and the other functional blocks may be similarly realized. Although the various processes described above have been described as being executed by one processor 1001, the processes may be executed simultaneously or sequentially by two or more processors 1001. The processor 1001 may be mounted using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing the created sentence evaluating method according to one embodiment of the present invention.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including the memory 1002 and/or a storage 1003, a server, or any other appropriate medium.

The communication device 1004 is hardware (a transmission/reception device) for performing inter-computer communication through a wired and/or wireless network and, for example, may also be called a network device, a network controller, a network card, a communication module, or the like. For example, the test sentence preparing unit 12, the output unit 14, the created sentence input unit 15, and the like may be realized by the communication device 1004.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or there may be a configuration of different buses between devices.

In addition, the created sentence evaluating device 1 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by hardware. For example, the processor 1001 may be mounted using at least one of such hardware components.

Notification of information is not limited to an aspect/embodiment described in this specification and may be performed using a difference method.

Each aspect/embodiment described in this specification may be applied to long term evolution (LTE), LTE-advanced (LTE-A), Super 3G IMT-advanced, 4G, 5G, future ratio access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), or a system using another appropriate system and/or a next generation system extended based on these.

The orders of processing sequences, the sequences, the flowcharts, and the like of each aspect/embodiment described in this specification may be changed as long as there is no contradiction therein. For example, in a method described in this specification, elements of various steps are presented in exemplary orders, and the method is not limited to the presented specific orders.

The input/output information and the like may be stored in a specific place (for example, a memory) or managed using a management table. The input/output information and the like may be overwritten, updated, or added thereto. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in this specification may be individually used, used in combination, or be switched therebetween in accordance with execution. In addition, a notification of predetermined information (for example, a notification of being X) is not limited to be performed explicitly and may be performed implicitly (for example, a notification of the predetermined information is not performed).

As above, while the present invention has been described in detail, it is apparent to a person skilled in the art that the present invention is not limited to the embodiments described in this specification. The present invention may be modified or changed without departing from the concept and the scope of the present invention set in accordance with the claims. Thus, the description presented in this specification is for the purpose of exemplary description and does not have any limited meaning for the present invention.

It is apparent that software, regardless of whether it is called software, firmware, middleware, a microcode, a hardware description language, or any other name, may be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, and the like may be transmitted and received via a transmission medium. For example, in a case in which software is transmitted from a website, a server, or any other remote source using wiring technologies such as a coaxial cable, an optical fiber cable, a twisted pair, a digital subscriber line (DSL) and the like and/or radio technologies such infrared rays, radio waves, and microwaves, and the like, such wiring technologies and/or radio technologies are included in the definition of the transmission medium.

Information, a signal, and the like described in this specification may be represented using any one among other various technologies. For example, data, an instruction, a command, information, a signal, a bit, a symbol, a chip, and the like mentioned in the entire description presented above may be represented using a voltage, a current, electromagnetic waves, a magnetic field or magnetic particles, an optical field or photons, or an arbitrary combination thereof.

In addition, a term mentioned in this specification and/or a term that is necessary for understanding this specification may be substituted with terms having the same meaning or a meaning similar thereto.

Terms "system" and "network" used in this specification are used interchangeably.

In addition, information, parameters, and the like described in this specification may be represented using absolute values, relative values with respect to predetermined values, or other corresponding information. For example, radio resources may be indicated using indices.

A name used for each parameter described above is not limited in any aspect. In addition, numerical equations using such parameters may be different from those that are explicitly disclosed in this specification.

Terms such as "determining" used in this specification may include various operations of various types. "Determining," for example, may include a case in which judging, calculating, computing, processing, deriving, investigating, looking up (for example, looking up in a table, a database, or any other data structure), or ascertaining is regarded as "determining." In addition, "determining" may include a case in which receiving (for example, receiving information), transmitting (for example, transmitting information), input, output, or accessing (for example, accessing data in a memory) is regarded as "determining." Furthermore, "determining" may include a case in which resolving, selecting, choosing, establishing, comparing, or the like is regarded as "determining" In other words, "determining" includes a case in which a certain operation is regarded as "determining."

Terms such as "connected" or "coupled" or all modifications thereof mean all the kinds of direct or indirect connection or coupling between two or more elements and may include the presence of one or more intermediate elements between the two elements that are mutually "connected" or "coupled." Coupling or connection between elements may be physical coupling or connection, logical coupling or connection, or a combination thereof. When used in this specification, two elements may be considered as being mutually "connected" or "coupled" by using one or more wires, cables and/or print electric connections and, as several non-limiting and non-comprehensive examples, by using electromagnetic energy such as electromagnetic energy having a wavelength in a radio frequency region, a microwave region, and a light (both visible light and non-visible light) region.

A statement of "on the basis of" used in this specification does not mean "only on the basis of" unless otherwise mentioned. In other words, a statement of "on the basis of" means both "only on the basis of" and "at least on the basis of."

Any reference to elements using names such as "first," "second," and the like used in this specification does not generally limit the amount or the order of such elements. Such names may be used in this specification as a convenient way for distinguishing two or more elements from each other. Accordingly, referring to the first and second elements does not mean that only the two elements are employed therein or the first element should precede the second element in a certain form.

A "means" illustrated in the configuration of each device described above may be substituted with a "unit," a "circuit," a "device," or the like.

As long as "including," "comprising," and modifications thereof are used in this specification or the claims, such terms are intended to be inclusive like a term "comprising." In addition, a term "or" used in this specification or the claims is intended to be not an exclusive logical sum.

In the entirety of the present disclosure, for example, in a case in which an article such as "a," "an," or "the" in English is added through a translation, such an article includes a plurality unless a singularity is represented clearly from the context.

REFERENCE SIGNS LIST

1 Created sentence evaluating device
10 Neural network unit
11 Parallel translation corpus storing unit
12 Test sentence preparing unit
13 Encoder input unit
14 Output unit
15 Created sentence input unit
16 Decoder input unit
17 Evaluation unit
100 Encoder unit
101 Decoder unit

The invention claimed is:

1. A created sentence evaluating device using a recurrent neural network of an encoder/decoder model in which an encoder inputs a sentence in a first language, and a decoder sequentially outputs word candidates for a sentence in a second language corresponding to the sentence in the first language and likelihood of the word candidates, the created sentence evaluating device comprising a circuitry configured to:
  input the sentence in the first language to the encoder;
  sequentially input respective words of a created sentence created in the second language to the decoder, the created sentence corresponding to the sentence in the first language to be input to the encoder; and
  evaluate the words of the created sentence on the basis of the word candidates in the second language and the likelihood of the word candidates output by the decoder on the basis of the input, and performs outputting based on a result of the evaluation.

2. The created sentence evaluating device according to claim 1, wherein the circuitry sequentially inputs the words of the created sentence to the decoder replacing the word candidates sequentially output by the decoder.

3. The created sentence evaluating device according to claim 1, wherein the circuitry evaluates a word next after an input word that is a word of the input created sentence on the basis of a word candidate in the second language and likelihood of the word candidate output by the decoder for the input word.

4. The created sentence evaluating device according to claim 1, wherein the created sentence is a sentence created by a user translating the sentence in the first language input to the encoder into the second language.

5. The created sentence evaluating device according to claim 1, wherein the circuitry displays evaluation values of the words of the created sentence.

6. The created sentence evaluating device according to claim 1, wherein the circuitry displays the words of the created sentence on the basis of evaluation values of the words.

7. The created sentence evaluating device according to claim 1, wherein the circuitry displays a word candidate of which the likelihood is higher than a predetermined criterion or a word candidate of which the likelihood is a maximum as a different candidate for a word of the created sentence.

8. The created sentence evaluating device according to claim 1, wherein the circuitry displays an evaluation value of the created sentence based on evaluation values of the words of the created sentence.

9. The created sentence evaluating device according to claim 2, wherein the circuitry evaluates a word next after an input word that is a word of the input created sentence on the basis of a word candidate in the second language and likelihood of the word candidate output by the decoder for the input word.

* * * * *